US005534329A

United States Patent [19]
Bunimovich et al.

[11] Patent Number: 5,534,329
[45] Date of Patent: Jul. 9, 1996

[54] COMPOSITE STRUCTURE

[76] Inventors: Haim Bunimovich, Vered St. 12, Kirvat Motzkin, 26394, Israel; Tatyana Loersky, 6542 Lakeridge Rd., Los Angeles, Calif. 90068

[21] Appl. No.: 275,621

[22] Filed: Jul. 14, 1994

[51] Int. Cl.⁶ .................................................. B32B 23/02
[52] U.S. Cl. .......................... 428/192; 428/121; 428/130; 428/119; 428/137; 428/157; 428/161; 428/172; 428/212
[58] Field of Search .................................. 428/172, 192, 428/33, 77, 119, 121, 130, 131, 137, 151, 161, 167, 212

[56]  References Cited

U.S. PATENT DOCUMENTS

| | | | |
|---|---|---|---|
| 2,683,927 | 7/1954 | Maronek | 29/521 |
| 3,579,809 | 5/1971 | Wolf | 29/509 |
| 3,650,144 | 3/1972 | James | 72/467 |
| 3,719,986 | 3/1973 | Ardolino | 29/509 |
| 3,909,919 | 10/1975 | Miyabayashi | 29/521 |
| 4,394,794 | 7/1983 | Shirey | 29/432 |
| 4,441,241 | 4/1984 | Hoeffken | 29/157.3 |
| 4,531,279 | 7/1985 | Gunter | 29/509 |
| 4,760,634 | 8/1988 | Rapp | 29/509 |
| 4,793,115 | 12/1988 | Horgan | 52/728 |
| 4,794,030 | 12/1988 | Celia | 428/172 |
| 4,803,767 | 2/1989 | Obrecht | 29/509 |
| 4,983,443 | 1/1991 | Balmer et al. | 428/172 |
| 5,075,150 | 12/1991 | Webb et al. | 428/172 |
| 5,237,734 | 8/1993 | Polon | 29/513 |

*Primary Examiner*—Donald Loney
*Attorney, Agent, or Firm*—Freilich Hornbaker Rosen

[57] ABSTRACT

A composite structure is provided which facilitates the joining of members having different physical properties, and that have sheet portions that lie facewise adjacent to each other. A first sheet-like member (16, FIG. 6) of first required properties such as steel which has high strength, is formed with a plurality of recesses (30A, 32A, 84). A second sheet-like member (24) of second required properties such as aluminum which has low weight and corrosion resistance, is formed with upstanding flanges to partially surround the first member. The second member is laid facewise against the first member and locations (26A, 28A, 80) on the second member are pressed into the recesses of the first member to join them. The first member preferably has tapered recesses (30A, 32A) in each of two opposite edges, and also (84) in its bottom face, and the second member has edge portions forming upstanding flanges (26A, 28A). With the first sheet portion received closely between the flanges of the second one, locations along the flanges of the second member are deformed into the edge recesses, while locations along the second sheet portion are deformed upwardly into the recesses in the bottom face of the first member.

3 Claims, 4 Drawing Sheets

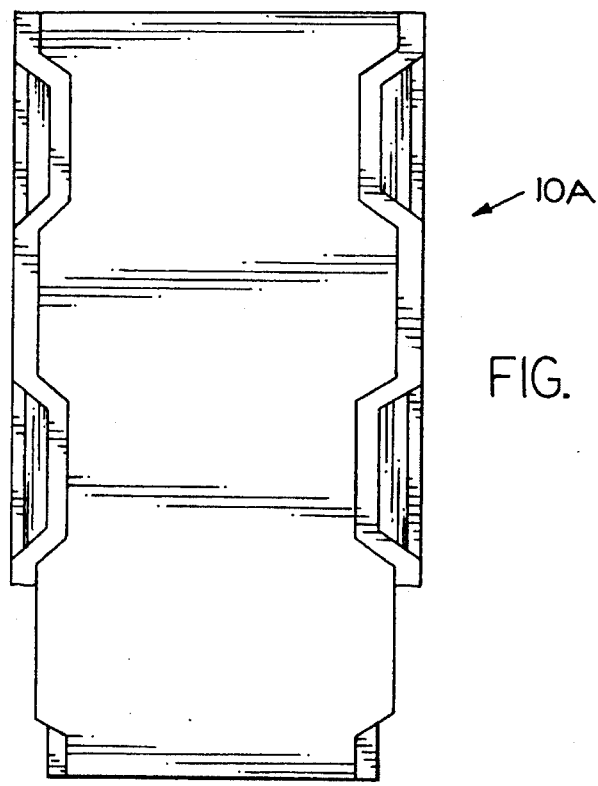
FIG. 5
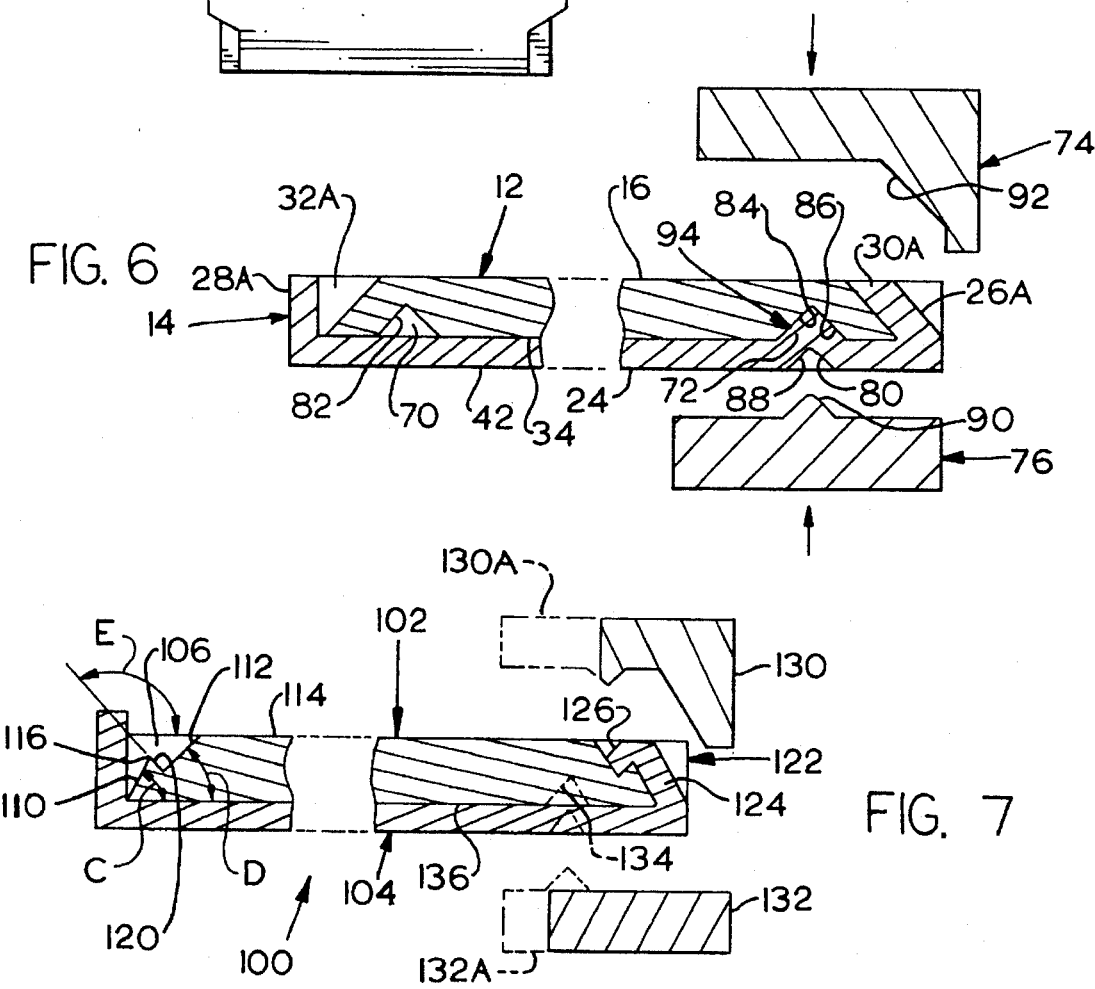
FIG. 6
FIG. 7

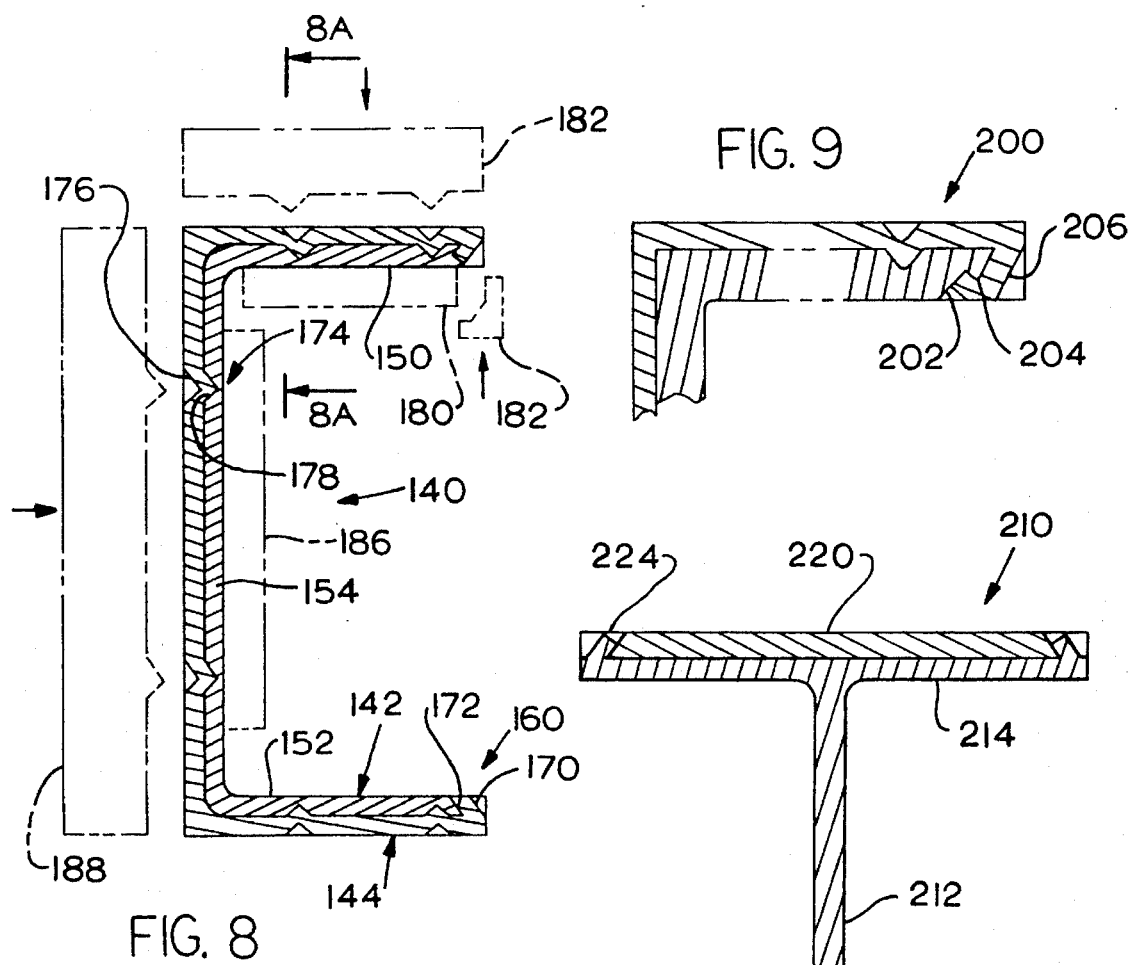
FIG. 8
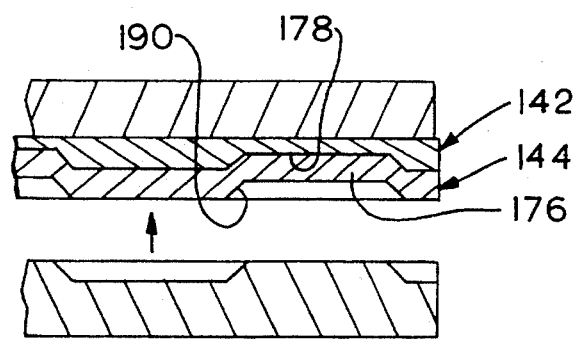
FIG. 8A
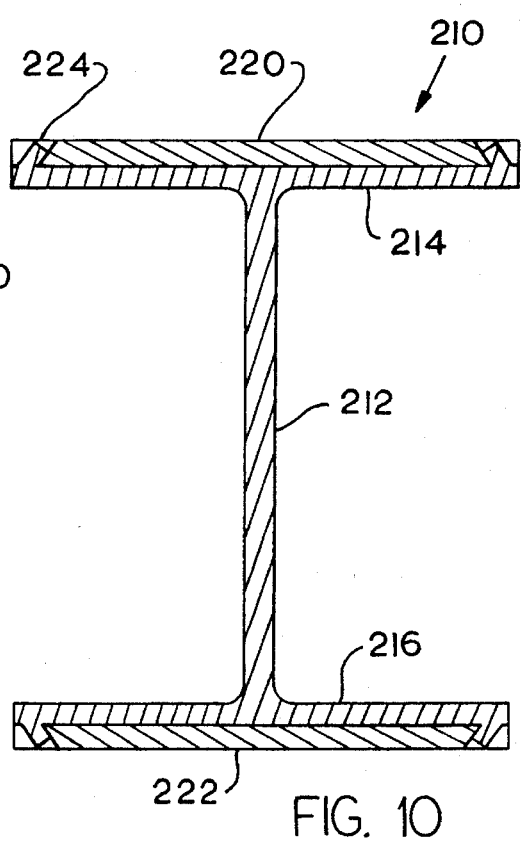
FIG. 9
FIG. 10

5,534,329

COMPOSITE STRUCTURE

BACKGROUND OF THE INVENTION

Structural members such as plates and beams can be made of two different materials of desirable properties that do not exist in any one material. For example, while ordinary steel has high strength and low cost, it is not highly corrosion resistant and it has a high density. Aluminum has high corrosion resistance and low density, but has less strength and a higher cost per unit weight than ordinary low cost steel. Stainless steel that includes nickel and chromium, has high strength and corrosion resistance, but has a high cost and a high density. A composite structure can be made by placing two sheets of different materials facewise adjacent and joining them, so that desirable properties of each material can be used. For example, a stainless sheet may form a corrosion resistant table top, while a steel sheet beneath it can provide strength at low cost.

Composite structures of different metals are not widely used because the cost for joining them is high. Known methods such as welding, riveting, screwing, brazing, etc. are often unsuitable, require the use of separate fasteners, and are relatively expensive. A method for joining sheet portions of dissimilar materials, which could be carried out at low cost, would facilitate the wider use of composite structures.

SUMMARY OF THE INVENTION

The present invention provides a composite construction wherein a male member is closely surrounded by a female member, and the combination strongly resists relative displacement of the members. A composite structure and methods for forming it are provided which enables the joining of sheet-like portions of dissimilar materials at low cost. The materials are joined by forming recesses in one of the members, which is usually the thicker member (which may be of higher strength material), and then laying the members facewise adjacent and deforming locations of the second member into the recesses of the first one.

The first member is preferably formed with recesses in its opposite edges and in its lower face. The second member has upstanding flanges, and the first member can fit closely between the flanges and against the upper surface of the second member. Swages are then used to deform locations along the flanges into the recesses in the edges of the first member. Also, a swage is used to press upwardly against locations on the lower face of the second member to deform those locations into the recesses in the lower face of the first member.

The novel features of the invention are set forth with particularity in the appended claims. The invention will be best understood from the following description when read in conjunction with the accompanying drawings.

BRIEF DESCRIPTION OF THE DRAWINGS

FIG. 5 is a plan view of the structure of FIG. 2, with a portion of the second member being cut away.

FIG. 6 is a sectional view of the structure of FIG. 2, with the left half of the figure showing the structure after partial assembly, and the right half showing the structure after full assembly, and also showing another set of swages that are used for the full assembly.

FIG. 7 is a sectional view of a composite structure of another embodiment of the invention, with the left half showing the structure after partial assembly, and the right half showing the structure after full assembly and also showing swages used therewith.

FIG. 8 is a sectional view of a fully assembled composite structure in the form of a C-beam, and showing in phantom lines, some of the swages used in the construction.

FIG. 8A is a view taken on the line 8A—8A of FIG. 8, with the swages shown in solid lines.

FIG. 9 is a partial sectional view of a portion of a C-beam of composite structure, which is constructed in accordance with another embodiment of the invention.

FIG. 10 is a sectional view of an I-beam composite structure of another embodiment of the invention.

DESCRIPTION OF THE PREFERRED EMBODIMENTS

Figure 1:
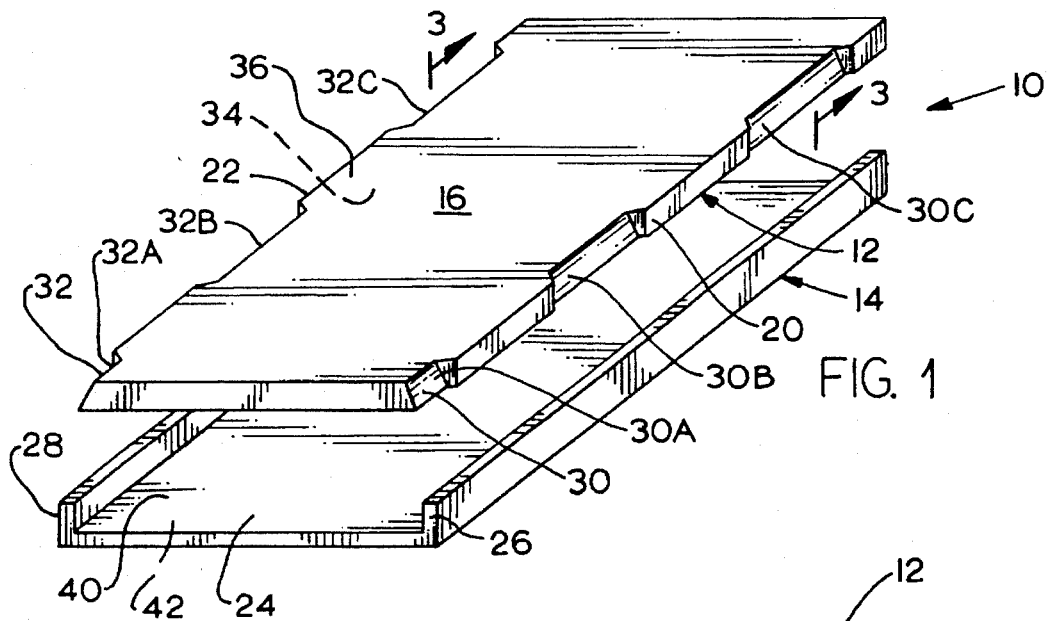
FIG. 1 is an exploded isometric view of a composite structure of a first embodiment of the invention.
Figure 3:
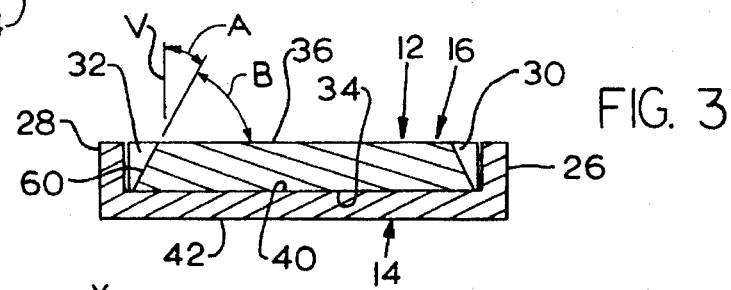
FIG. 3 is a sectional view taken on the line 3—3 of FIG. 1, after partial assembly of the members thereof.

FIG. 1 illustrates a composite structure 10 which includes a first or male member 12 and a second or female member 14. The first member 12 has a sheet portion 16 occupying substantially all of the first member, with the sheet portion having opposite edges 20, 22. The second member 14 has a sheet portion 24 and has edge portions 26, 28 that have been formed with upstanding flanges. The first member 12 has been formed with recesses 30, 32, including three recesses 30A, 30B, 30C spaced apart along one edge, and three recesses 32A, 32B, 32C spaced along its other edge. The sheet portion 16 of the first member has inner and outer faces 34, 36 and the sheet portion 28 of the second member has inner and outer faces 40, 42. As shown in FIG. 3, the members are assembled by first placing their inner faces 34, 40 facewise adjacent, and with the sheet portion 16 of the first member lying between the upstanding flanges 26, 28 of the second member.

Figure 2:
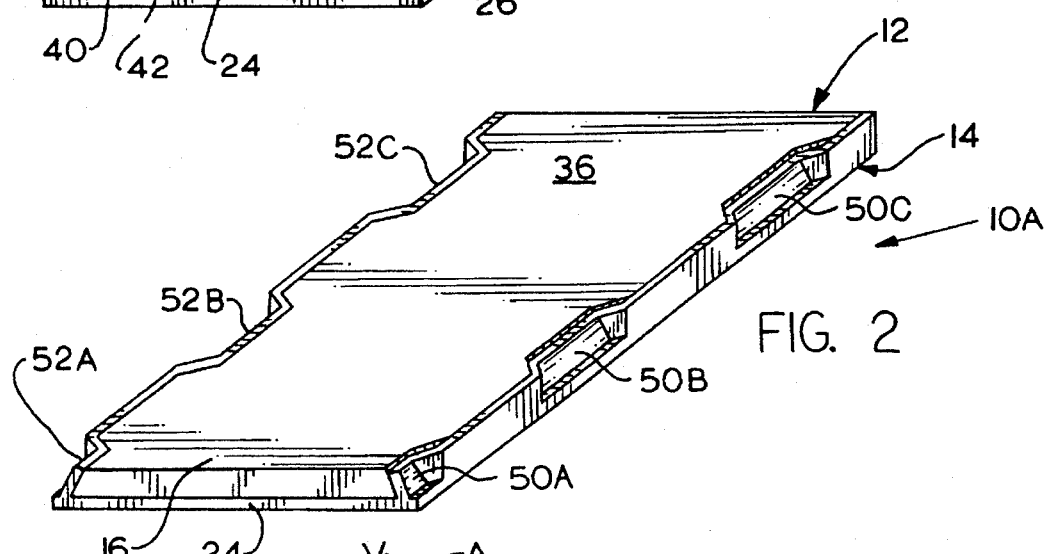
FIG. 2 is an isometric view of the structure of FIG. 1 in its fully assembled condition.
Figure 4:
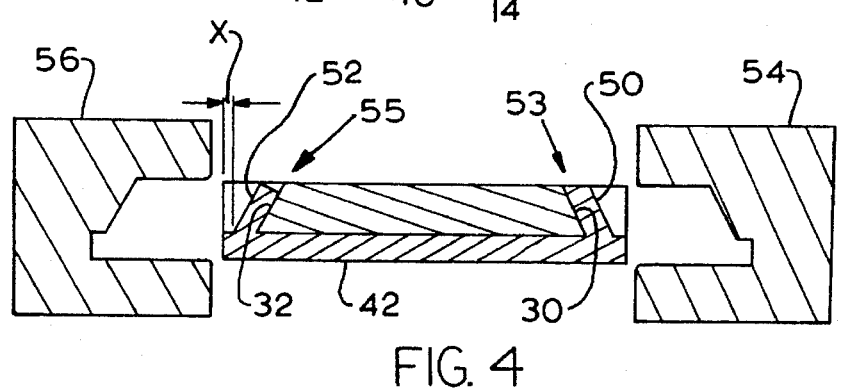
FIG. 4 is a view of FIG. 3 after final assembly thereof, and showing swages used in the final assembly.

After the members have been placed as shown in FIG. 3, locations along the flanges 26, 28 are deformed into the recesses 30, 32 to form edge deformation joints. FIG. 4 shows deformed flange locations 50, 52 which have been deformed into corresponding recesses 30, 32 to form edge deformation joints 53, 55. The deformation has been made by swages 54, 56. As the material of the female member 14 is bent and displaced during swaging, the side surfaces at the flange locations are strained and the perimeter of the displaced volume is considerably increased. However, the bent and displaced locations remain securely connected to the rest of the female member. The horizontal displacement X makes up for the slight difference in original horizontal width of the first sheet portion 16 and of the distance bet, ween flanges of the second sheet member. FIG. 2 shows the fully constructed composite structure at 10A, wherein three flange locations 50A, 50B, 50C on one side or edge portion and three locations 52A, 52B, and 52C on the other side have been deformed into corresponding recesses.

In one example of the composite structure 10A, the first member 12 is of steel (Young's modulus of elasticity of $30\times10^6$ psi) while the second member 14 is of aluminum (Young's modulus of elasticity of $10\times10^6$ psi). The aluminum material may be required at the outer face 42 of the second member, such as to provide a corrosion-resistant surface and a more attractive appearance. The steel first member 12 has a much higher rigidity and strength and a lower cost than the aluminum second member 14, so the aluminum member 14 is strengthened at relatively low cost. An alternative to a composite structure would be a much thicker plate formed solely of aluminum, but that plate would be much thicker and might cost considerably more in order to achieve the same strength.

Another example where the composite structure 10A can be useful is where the outer face must be hard and corrosion resistant and the structure must be rigid against bending, as for a laboratory table. In that case, the table-plate (whose upper surface forms the table top) may be constructed as in FIG. 1 but turned over. The member 14 may be constructed of thin stainless steel that provides corrosion resistance and hardness of the upper table surface. The thicker member 12 is of steel that is less corrosion resistant, but has high strength and a much lower cost than stainless steel. Thus, the required properties are achieved while reducing the cost.

Composite structures of the present invention can be made of a wide variety of metals and metal alloys. The male members of a composite structure can be made of hardened steel alloys and of hardened aluminum alloys. Locations on the lower strength metal of the female member can be pressed into recesses previously formed in the hardened male member. The male members also can be made of certain plastics (polymers) that have sufficiently hard edges, so that locations of mild steel or aluminum ca be safely pressed into the recesses of a plastic male member.

Prior to assembling the members of FIG. 1, the recesses 30, 32 are formed in the first member. A variety of methods can be used to form the recesses, including deforming the edges with swages when the steel plate of the first member 12 was hot during initial forming. Alternately, the recesses can be made by punching, pressforming, casting, electrochemical erosion, machining, etc. As shown in FIG. 3, each recess such as 32 extends at an incline to the vertical direction V when the faces 34, 36 of the first member lie in horizontal planes. The incline angle A, and the angle B of the recessed bottom wall 60 with respect to a face such as 36 of the first member (on a side away from the edge), are both acute angles, in that they are each less than 90°. That is, the horizontal width of the recess is greater in the outer face of the first member, which is away from the second member. Applicant prefers that the angle A of incline of each recess be between about 10° and 45°. At least about 10° is necessary to securely the lock the first member in place against the second one. If the angle A is much more than about 45°, then this requires excess deformation of the flange locations, and does not result in any better trapping of the first member within the second one.

FIG. 6 shows a variation of the method of FIG. 3, in that applicant locks the members 12, 14 together more securely by deforming a location in a face of one member into a recess in the face of the other member to form a sheet deformation joint 94. The left side of FIG. 6 shows that the first member 12 is formed with a recess 70 in the form of a blind hole, in its inner face 34. As shown in the right half of FIG. 6, applicant uses a pair of swages 74, 76 to deform a location 80 of the sheet portion 24 of the second member into a blind hole or recess 72 of the first member. The recess is tapered, in that it is of progressively smaller width at progressively higher locations (locations progressively further from the inner face 34). This is accomplished by forming the recessed bottom wall 62 with a pair of sides 84, 86 which are angled towards each other in an upward direction. The deformation results in a recess 88 in the outer surface 42 of the second member 14, and in the second member substantially completely filling the blind hole (i.e. filling at least 75% of it).

The recesses 70, 72 are formed prior to assembling the members for joining. The members are assembled by moving swages 74, 76 toward each other to tightly clamp and compress the members between the swages. The lower swage 76 has a protrusion 90 which deforms the location 80 of the second member into the recess of the first one, and also backs up the second member 14. The upper swage 74 has an angled surface 92 which bends over a flange 26A, and which also backs up the first member. By means of the sheet deformation joints at 94 in the sheet portions of the members, applicant holds the members together at locations spaced from their edges. As shown in FIG. 2, applicant can provide several sheet deformation joints 94 where the sheet portions 16, 24 of the members lie facewise against each other.

FIG. 7 illustrates another composite structure 100 with first and second members 102, 104 joined near their opposite edges, but with an edge joint that is different from that shown in FIGS. 3 and 4. The male or first member 102 has recesses 106 in each of its opposite edges. However, the bottom contact surface or bottom wall of the recess includes lower and upper parts 110, 112 that each extend at an acute angle C, D with respect to the faces such as 114 of the first member. The recess bottom wall also includes a prominence 116 formed between the lower and upper parts. A far side 120 of the prominence, which is the side furthest from the extreme edge of the member and which connects the other parts 110, 112, extends at an obtuse angle E with respect to the first member face 114. The flange location 122 has a lower part 124 that is bent by an angle C from the vertical against the lower part 110 of the recessed bottom wall, and includes an upper part 126 which is bent even further to lie substantially against the far side 120 of the prominence. The double bend of the flange location, which includes an upper part 126 that extends in a downward incline away from the adjacent edges of the members, results in the flange locations being securely locked to the walls of the recess. That is, the top parts 126 of the flange locations greatly resist any unbending of the bent flange. The deformation is performed by a pair of swage members 130, 132 of the construction shown. Where the first member is to be formed with a recess 134 in its inner face 136 and the sheet portion of the second member is to be deformed into that recess, then the swage members are preferably formed with additional portions shown at 130A and 132A.

Any single one of the above-described joining methods and resulting joints, is usually sufficiently to assure that the members will not move relative to one another in use. Where it is undesirable to deform locations in a smooth plane surface, the joint between members may be located only at their edges.

FIG. 8 shows a C-beam 140 of composite construction, including a first or male member 142 and a second or female member 144. Each member such as the first one, has upper and lower sheet portion 150, 152 and a middle sheet portion 154. Only the upper and lower sheet portions have edges, and each has only one edge. Applicant joins the upper and lower sheet portions with edge joints such as edge joint 160 which includes deformed edge locations 170 of a flange of the second member 144, which are deformed into recesses 172 in the first member. Additional joints such as at 174 join sheet portions of the first and second member together by deforming a location such as 176 of the second member into a recess 178 of the first member.

FIG. 8 shows three swage members 180, 182, 184 that form joints at the upper sheet portions, and show a pair of swage members 186, 188 which form joints at the vertical sheet portions. FIG. 8A shows that the recesses 178 in the first member and the deformed portions 176 in the second member, are preferably elongated and have tapered ends such as shown at 190.

FIG. 9 is a view of the upper portion of a C-beam 200 of a construction similar to that of FIG. 8, but with the edge recesses 202 each being formed with a prominence 204 and with each deformed flange portion 206 having a double bend, in a manner of a joint of FIG. 7.

FIG. 10 shows an I-beam composite structure 210, which includes a main member 212 in the form of an I-beam but with relatively thin top and bottom plate parts 214, 216. Reinforcing second members 220, 222 are joined to the plate parts of the main member at edge joints such as 224 that are similar to those of the structure 10 of FIG. 3.

Figure 11:
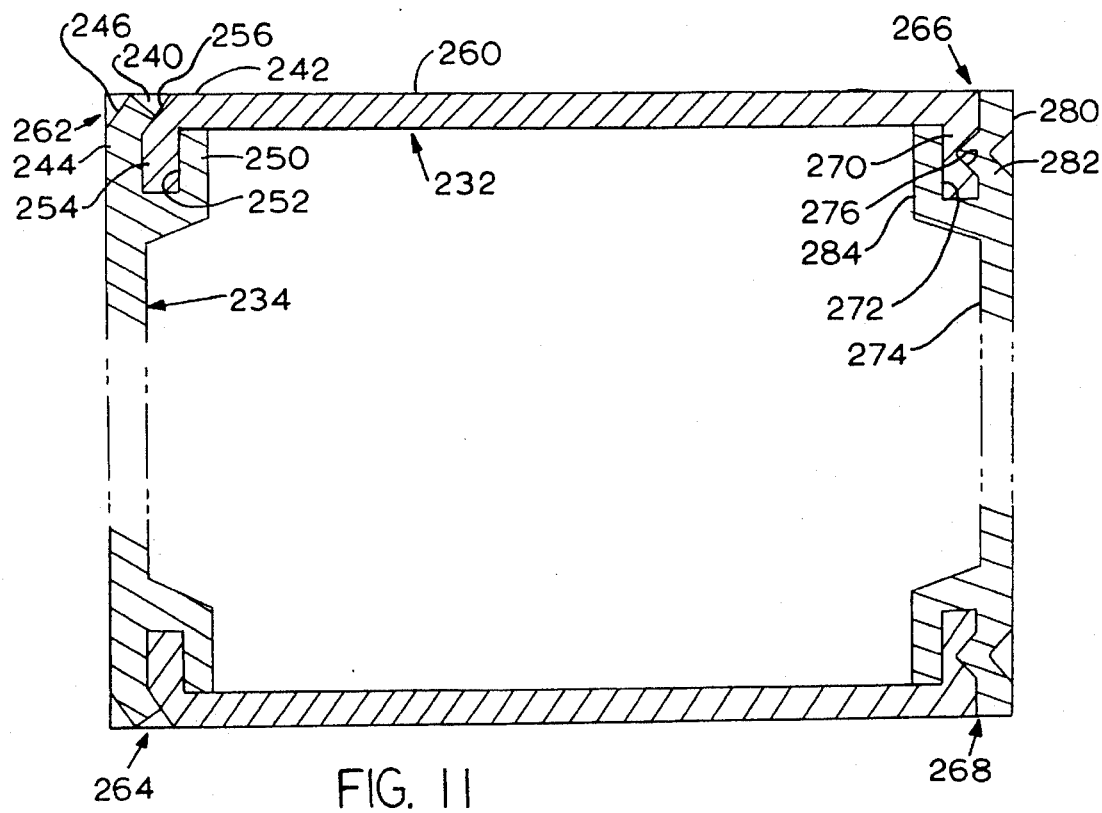
FIG. 11 is a sectional view of a box-like composite structure of another embodiment of the invention.

FIG. 11 shows a composite structure 230 in the form of a rectangular box, but with sides of different materials that are joined near their edges. First and second members 232, 234 can be considered to have edge portions, with the member 232 having a recess 240 in an edge portion 242, and the other member having a flange 244. The flange 244 extends perpendicular to the sheet portion 245 of the first member and is deformed at 246 into the recess 240. The second member has a wall 250 lying substantially opposite its flange 244, to form a slot 252. An edge portion of the first member 232 has a depending flange 254 which is received in the slot 252. The construction provides a joint somewhat similar to those of the embodiment of FIG. 4, in that it includes a recess 240 in one of the members, with a bottom wall 256 of the recess extending at an acute angle with an outer surface 260 of the first member, and in that the second member 234 has a flange with a deformed portion at 246 that is deformed into the recess. The resulting corner joint 262 securely holds the members 232, 234 together. A similar joint 264 is formed at the lower left corner. Joints 266, 268 of different constructions are shown at the other two corners. The first member 232 has a depending flange 270 that is captured in a slot 272 formed by an additional second member 274. The flange 270 is formed with a recess 276, and a portion 280 of the additional second member is deformed at 282 into the recess. The fact that the additional second member 274 has two opposite walls at 284 and at 280, results in trapping of the depending flange 270 of the first member, and the deformed portion at 282 prevents the flange from pulling out of the slot. In one application, locations on the second member 234 and additional second member 274 are constructed of aluminum and are exposed to weathering, while the first member 232 and an additional first member 286 are formed of steel for high strength and are not subject to considerable corrosion.

Figure 12:
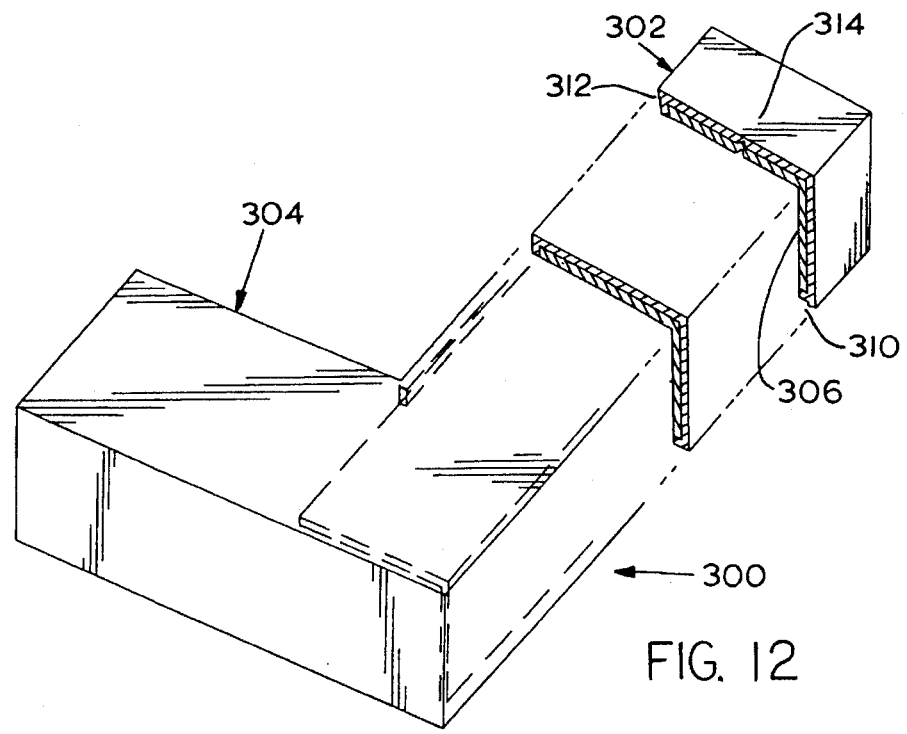
FIG. 12 is an isometric view, with cross sections, of a composite structure of another embodiment of the invention.

FIG. 12 illustrates a composite construction 300 in the form of an L-shaped stand, with one leg 302 of the stand being subject to heavy loading and the other leg 304 being subject to only light loading. The leg 302 is reinforced by a bent sheet 306 of high strength material, with edge joints at 310, 12, and with a sheet joint at 314 similar to those shown above in FIG. 6.

The strength of a structural member such as a sheet, angle, channel, beam, tube etc., is determined mainly by its bending strength. The bending strength is proportional to the moment of inertia and to the modulus of elasticity. The composite construction of the present invention enables an increase in cross section by joining an additional member of the same material in optimal places, thus increasing the moment of inertia. The present invention allows the joining of a reinforcing member of a stronger material in optimum places, thus increasing the moment of inertia, the strength and the modulus of elasticity. As shown in FIG. 11, the proposed methods enable not only a part of the thickness, but also a part of the cross section or of the length of a structure, to be of a different material having other physical and mechanical properties.

Although applicant has shown only deformation joints where locations on a second member are deformed into recesses already formed in the first member, it should be realized that additional joints can be used to supplement the illustrated joints. For example, adhesive bonds, welds (where the metals are similar) and rivets can be used to supplement the deformation joints. It also should be noted that while terms such as "vertical", "horizontal", etc. have been used hereinto help the description of the parts as shown, the parts and the final composite construction can be used in any orientation with respect to the earth's gravity.

Thus, the invention provides composite structures with deformation joints that join different members which are usually constructed of different materials. A first member, which is usually formed of the harder material of the two, is initially formed with recesses. The second member is laid against the first one, and locations on the second member are deformed into the recesses of the first member. In the case of edge joints at the edge of the first member, the first member has edge recesses, which extend at an acute angle to the upper surface of the first member, and the second member has a flange which is deformed into that recess. In the case of sheet deformation joints in facewise adjacent sheet portions, a location on the second sheet portion is deformed upwardly into a tapered recess already formed in the first member, and the second member preferably substantially fills the recess.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. A composite structure comprising:

a first member that has an outer face, an edge, and an inner face and that has a plurality of spaced recesses in its edge, with each recess being wider at said outer face than at said inner face;

a second member that has a portion lying against a location of said first member that is opposite said outer face, said second member also having a flange lying adjacent to said edge and deformed at each of said spaced recesses into said recesses.

2. A composite structure which includes first and second members that have first and second sheet portions with inner abutting faces lying facewise against each other and that have opposite outer non-abutting faces, wherein:

said first sheet portion has at least one edge, and said first sheet has a plurality of spaced blind holes therein that are each tapered in width to be progressively narrower at locations progressively further from said inner face of said first member;

said second member has at least one upstanding flange which is bent largely 90° out of the plane of an adjacent part of its second sheet portion, with said flange lying adjacent to said edge of said first sheet portion;

said edge of said first sheet portion has at least one recess formed therein, and said flange has at least one location deformed into said recess to form an edge deformation joint;

said recess and the flange locations deformed therein, each have at least one part that extends at an acute angle with respect to said outer face of said first sheet portion;

said second member has a plurality of locations corresponding to said blind holes in said first member, with each of said locations being deformed into a corresponding blind hole to substantially fill the blind hole with material of said second member.

3. A composite structure which includes first and second members that each have sheet portions with inner faces lying facewise against each other and with opposite outer faces, wherein:

said first member has a recess extending into its inner face;

said second member is deformed into said recess;

said outer face of said first member is substantially flat and undeformed at locations adjacent to the location of said recess;

each of said sheet portions has opposite edge portions with primarily parallel edges;

said edge portions of said second member are each bent upwardly from said inner face to form flanges, and said first sheet portion lies between said flanges with said inner faces of said sheet portions abutting each other;

said edges of said first sheet portion each have at least two recesses that are spaced apart along the length of the corresponding edge, with each recess having a bottom wall extending at an acute angle with respect to said outer face of said first sheet, so said recess is wider at said outer face of said first sheet than at said inner face thereof;

said flanges each have at least two locations corresponding to said recesses that are deformed into contact with at least part of a corresponding recess bottom wall.

* * * * *